V. J. & A. TICHOTA.
DRAFT EQUALIZER.
APPLICATION FILED JAN. 26, 1914.
1,096,140.
Patented May 12, 1914.
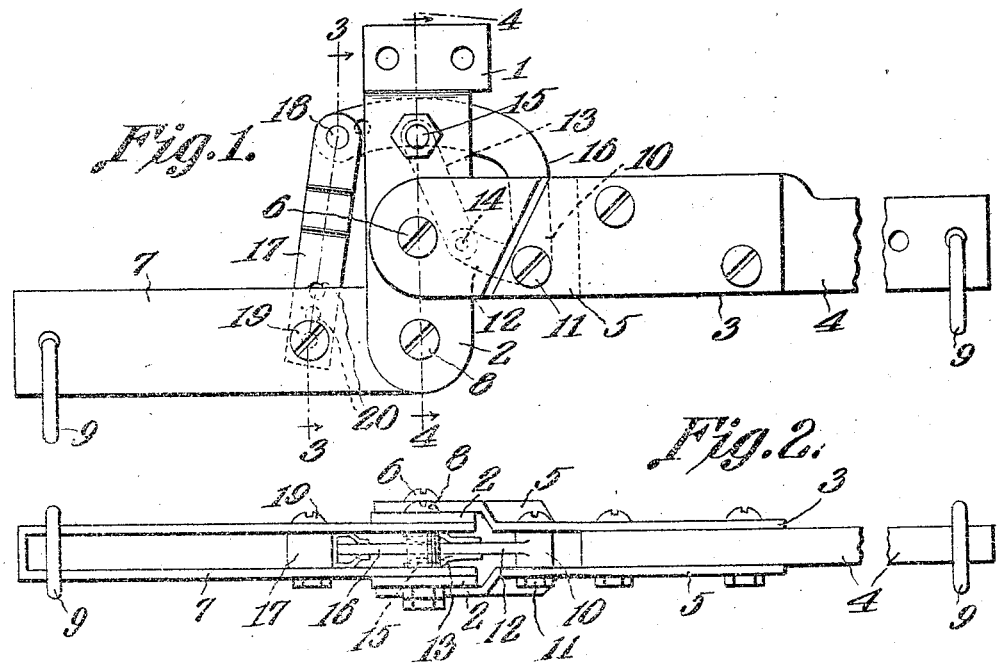
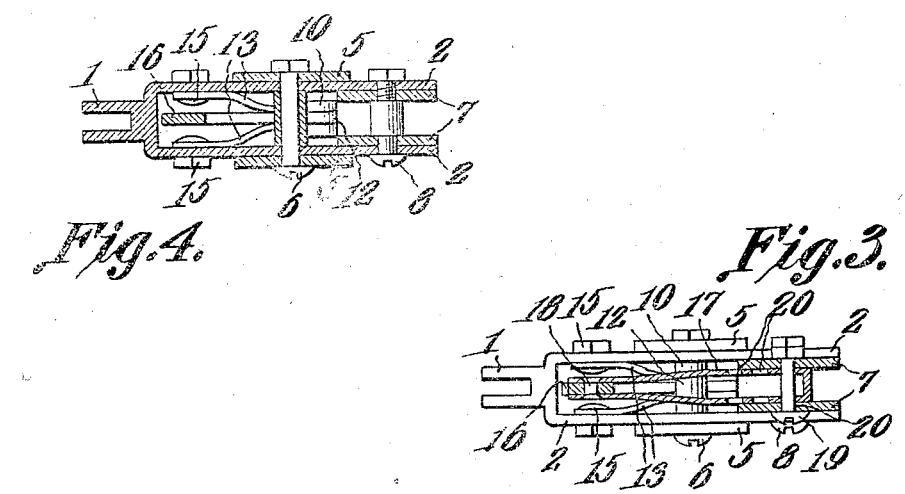
Vencel J. Tichota,
August Tichota
Inventors

UNITED STATES PATENT OFFICE.

VENCEL J. TICHOTA AND AUGUST TICHOTA, OF DODGE, NEBRASKA.

DRAFT-EQUALIZER.

1,096,140.  Specification of Letters Patent.  Patented May 12, 1914.

Application filed January 26, 1914. Serial No. 814,499.

*To all whom it may concern:*

Be it known that we, VENCEL J. TICHOTA and AUGUST TICHOTA, citizens of the United States, residing at Dodge, in the county of Dodge, State of Nebraska, have invented a new and useful Draft-Equalizer, of which the following is a specification.

The present invention appertains generally to draft equalizers, and aims to provide a novel and improved appliance of that character, the present invention being particularly an improvement over the draft equalizers disclosed in Patent No. 1,076,331 issued October 21, 1913, and in application Serial No. 752,707.

It is the object of the present invention to provide a draft equalizer embodying a pair of levers to which various numbers of draft animals may be hitched or attached, in connection with unique means for operatively connecting the said levers to properly and effectively distribute the draft between the two sets of draft animals, whereby the resultant draft will be practically in the line of movement of the plow, harvester, or other structure to which the equalizer is applied, the present contrivance avoiding any excesside side draft.

It is also the object of the present invention to provide a draft equalizer embodying simple, compact and inexpensive means for operatively connecting the two levers for the attachment of the draft animals, and which will also be simple, practical and efficient in operation.

With the foregoin general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the improved draft equalizer, portions being broken away. Fig. 2 is a front view of the parts depicted in Fig. 1. Figs. 3 and 4 are sectional views taken on the lines 3—3 and 4—4 of Fig. 1, respectively.

In carrying out the present invention, there is provided a clip or member 1, which is adapted to be bolted, or otherwise fastened, to the beam or other part of a walking or riding plow, to the tongue or front axle of a harvester or other vehicle, or to any other structure to be drawn or pulled by draft animals. The clip or member 1 is provided with a pair of forwardly projecting leaves or arms 2, which are spaced apart and which are superposed. The clip or member 1 with its leaves or arms 2, forms the body or frame of the draft equalizer which is attachable to the structure or object to be drawn or pulled.

The present device embodies a long lever 3, which is preferably constructed of a wooden bar or beam 4 of suitable length, and a pair of metallic strips or plates 5 bolted or otherwise secured to the inner end of the bar 4 and having their free ends projecting to form a fork straddling the arms or leaves 2 intermediate their ends, the said fork being fulcrumed or pivoted to the arms 2 by means of a bolt or pivot member 6 passed through the strips or plates 5 and the arms 2.

A relatively short lever 7 preferably bent from a strip of metal into U-shape, has its inner end or terminals pivoted or fulcrumed between the forward or free ends of the arms 2, by means of a bolt or pivot member 8 passed through the free ends of the arms 2 and the inner end of the lever 7. Thus, the short lever 7 is fulcrumed to the body or frame in advance of the long lever 3, the levers 3 and 7 being provided at their free or remote ends with clevises, or other coupling members 9, for the attachment of whiffle trees, double trees, swingle trees or the like, whereby various numbers of draft animals may be hitched to the two levers, according to the circumstances. The clevises or coupling members 9 may be adjusted along the levers 3 and 7, if desired, when the number of draft animals in the two sets are varied.

The mechanism for operatively connecting the levers 3 and 7 embodies an angular or bell crank lever 10 having its elbow fulcrumed between the strips or plates 5 of the long lever 3 intermediate the fulcrum of the said lever and the inner end of the bar 4, by means of a bolt or pivot member 11 passed through the strips or plates 5 and the elbow of the floating lever 10. The bar for the lever 3 is preferably of less thickness than the space between the arms or leaves, and the free portions of the strips or plates 5 are off set away from each other, so as to straddle the arms or leaves 2, the lever 10 being fulcrumed between those portions of the strips 5 between the offset portions and the inner or butt end of the bar 4. The lever 10 embodies a short arm 12 projecting toward the fulcrum of the long lever 3, a pair of links 13 being pivoted to the free end or extremity of the arm 12, by means of a rivet, bolt or other pivot member 14. The other ends of the links 13 are pivotally anchored to the rear or butt portions of the arms or leaves 2 by means of independent bolts, rivets or pivot members 15, the inner ends of the respective links 13 being pivoted to the upper and lower arms or leaves 2, in spaced positions, the inner ends or heads of the pivot members 15 being preferably countersunk or rounded, so as not to present any obstruction to the other arm of the lever 10, as will hereinafter appear. To pivot the links 13 to the respective arms 2, the rear end or anchored portions of the links 13 are preferably offset away from each other, as seen in Figs. 3 and 4. The other arm 16 of the lever 10, which is relatively long, is curved or angular, as seen in Fig. 1, and passes between the rear end or butt portions of the leaves or arms 2, so as to swing between the rear ends of the links 13 and the pivot members 15. Thus, the arm 16 of the lever 10 which is fulcrumed to and carried by the long lever 3, projects between the arms or leaves 2 to the opposite side of the body or frame, the short arm 12 of the lever 10 being linked or loosely anchored to the body or frame. The free end of the arm 16 is connected loosely to the short lever 7, by means of a link 17, which is preferably bent from a strip of metal, into U-shape, the rear end or terminals of the link 17 being pivoted over the free end of the arm 16, by means of a rivet, bolt or other pivot member 18. The forward end or bend of the link 17 is disposed between the sections or limbs of the lever 7, and is pivoted therebetween, by means of a bolt or other pivot member 19 passed through the sections or limbs of the lever 7 and the sections of the link 17, the sections or limbs of the link 17 being provided with a series of apertures 20 for the reception of the bolt 19, whereby the link 17 and lever 7 may be adjustably connected, to alter or vary the normal positions of the levers 3 and 7 with respect to each other The lever 10 and links 13 and 17 provide a simple and effective connection for the levers 3 and 7, whereby the draft may be divided or distributed proportionately between the two levers 3 and 7. When the lever 7 is swung forwardly the link 17 being carried therewith, will swing the arm 16 of the lever 10 forwardly, and the arm 12 of the lever 10 being linked or anchored to the body or frame of the present device, will cause the fulcrum or elbow of the lever 2 to be drawn rearwardly, to thereby swing the long lever 3 rearwardly, but at a less velocity or ratio than the lever 7. Conversely, when the lever 3 is drawn forwardly, the elbow or fulcrum of the lever 10 will be drawn forwardly therewith, and the arm 12 of the lever 10 being linked or anchored to the frame of the device, will cause the arm 16 of the lever 10 to be swung rearwardly and to the right, as seen in Fig. 1, whereby the link 17 will be drawn rearwardly to thereby swing the short lever 7 rearwardly, and at a greater velocity or ratio than the forward movement of the long lever 3. In this manner, the draft may be effectively distributed between the two sets of draft animals hitched to the levers 7 and 3, the number of animals in the set attached to the lever 7 being greater than those hitched to the lever 3. The present device therefore serves to effectively balance the draft between the free ends of the levers 3 and 7, whereby the draft created by one set of draft animals, will effectively counteract the draft created by the other set of draft animals. The present contrivance is adapted for various numbers of draft animals, within practical limits, as will be obvious.

From the foregoing, the advantages and capabilities of the present invention will be obvious to those skilled in the art, and need not be further commented upon, it being noted that the objects aimed at have been carried out satisfactorily.

Having thus described the invention what is claimed as new is:—

1. In a draft equalizer, a body, a pair of levers fulcrumed thereto, a floating lever fulcrumed to and carried by one of the said levers, the floating lever having one arm loosely anchored to the body and one arm loosely connected to the other first mentioned lever.

2. In a draft equalizer, a body, a pair of levers fulcrumed thereto, a floating lever fulcrumed to and carried by one of the said levers, a link connecting one arm of the floating lever and the body, and a link connecting one arm of the floating lever and the other first mentioned lever.

3. In a draft equalizer, a body, long and short levers fulcrumed thereto, and projecting to opposite sides of the body, a bell crank lever having its elbow fulcrumed to the long lever, the bell crank lever having a short arm projecting toward the fulcrum of the long lever and having a curved long arm projecting to the other side of the body in rear of the short lever, and links connecting the short arm of the bell crank and the body, and the long arm of the bell crank lever and the short lever.

4. In a draft equalizer, a clip attachable to a plow or other structure, and having a pair of forwardly projecting arms, a long lever having a fork at one end pivoted to the said arms, a short lever having one end fullever having a fork at ont end pivoted to the sai darms, a short lever having one end fulcrumed to the said arms, the long and short levers projecting toward opposite sides of the body, a bell crank lever having its elbow fulcrumed within the fork of the long lever, the bell crank lever having a short arm projecting toward the fulcrum of the long lever and having a curved long arm projecting between the aforesaid arms in rear of the short lever, a link connecting the free end of the long arm of the bell crank lever with the said short lever, and a pair of links connected to the short arm of the bell crank lever, and to the respective first mentioned arms in spaced relation for the passage of the long arm of the bell crank lever.

In testimony that we claim the foregoing as our own, we have hereto affixed our signatures in the presence of two witnesses.

VENCEL J. TICHOTA.
AUGUST TICHOTA.

Witnesses:
HERMAN HOLSTEN,
R. H. HOLSTEN.